April 28, 1964    E. A. WOLICKI ETAL    3,131,299
RAY-TRACING METHOD FOR ION-OPTICAL MEASUREMENTS
Filed Dec. 29, 1961    5 Sheets-Sheet 2
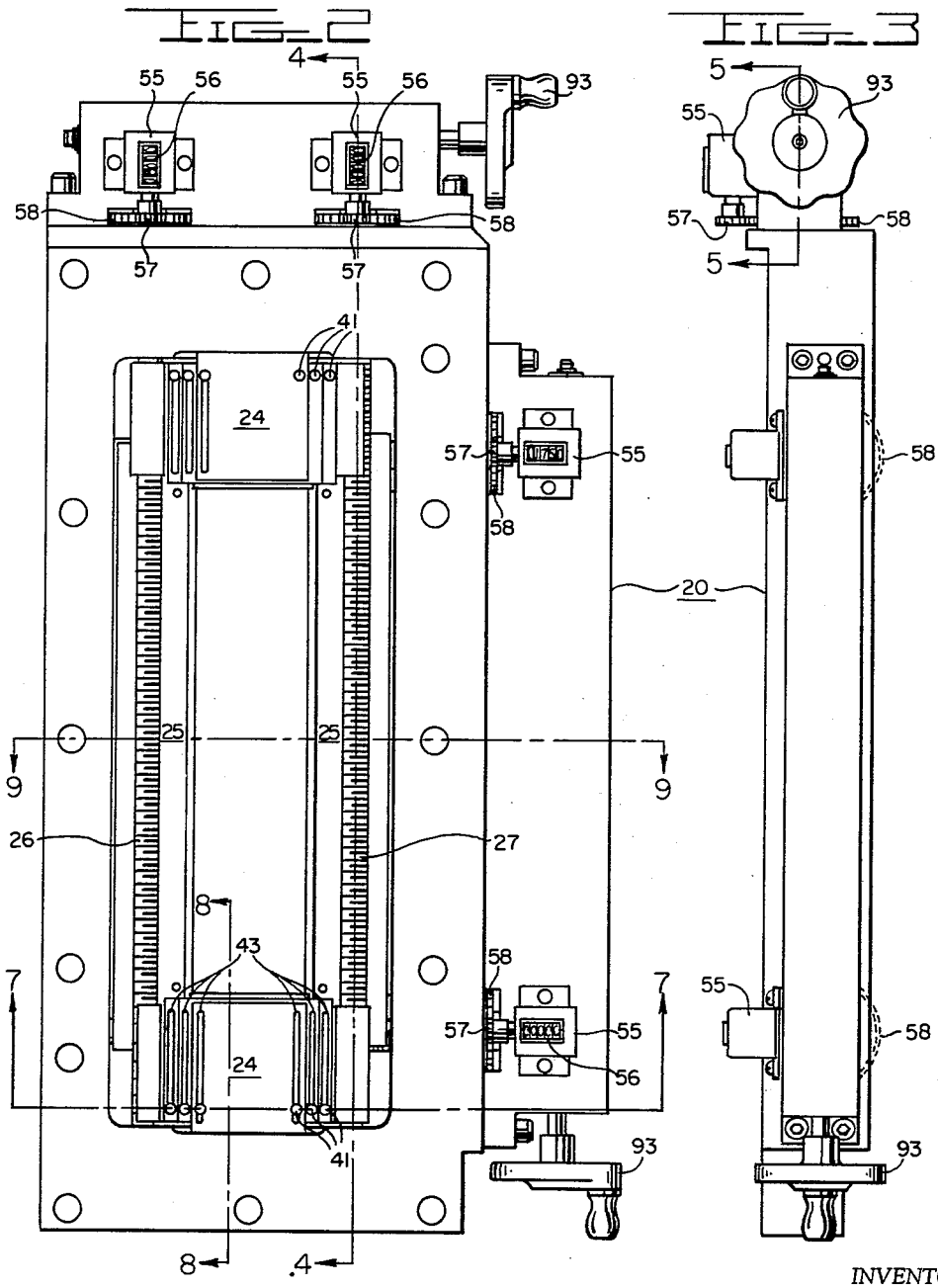
INVENTORS
ELIGIUS A. WOLICKI
PHILIP R. MALMBERG
BY
Melvin L. Crane, Agent
Richard C. Reed
ATTORNEY

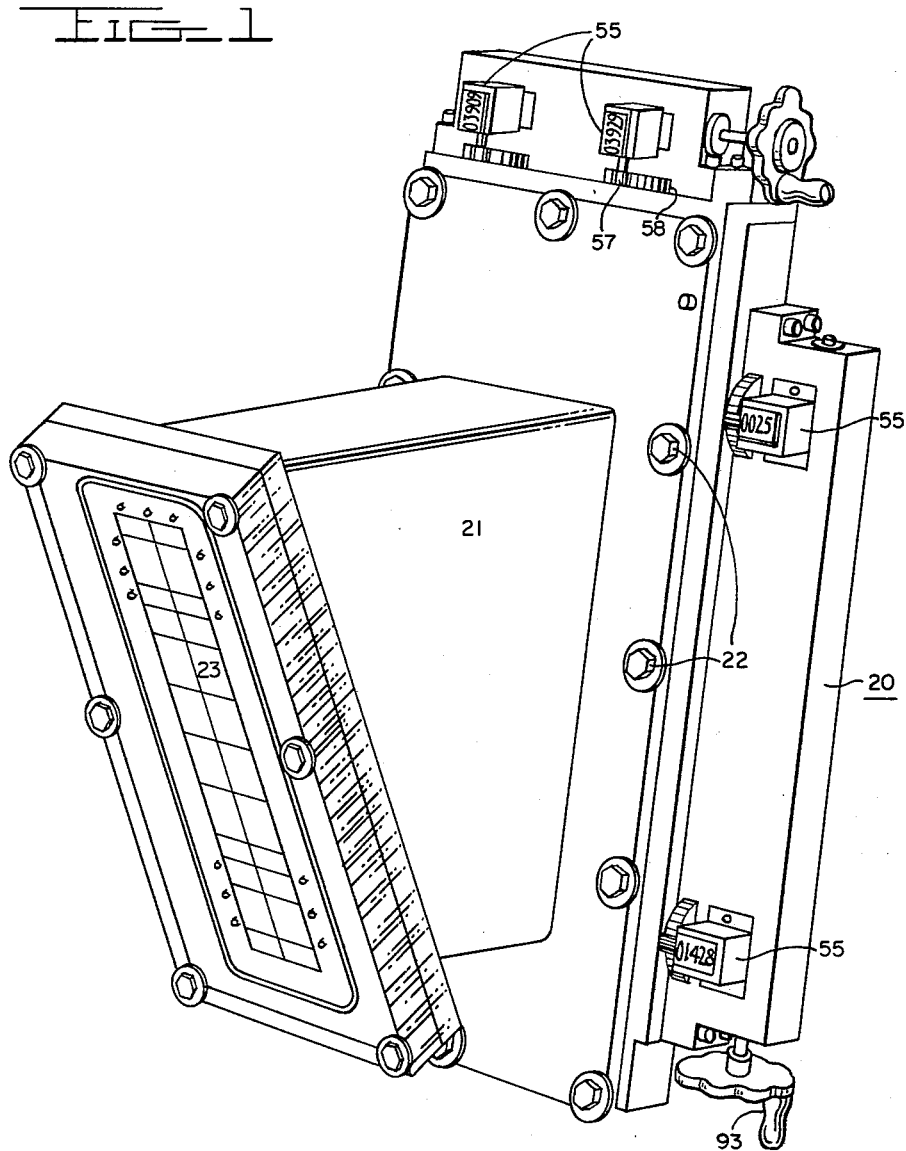

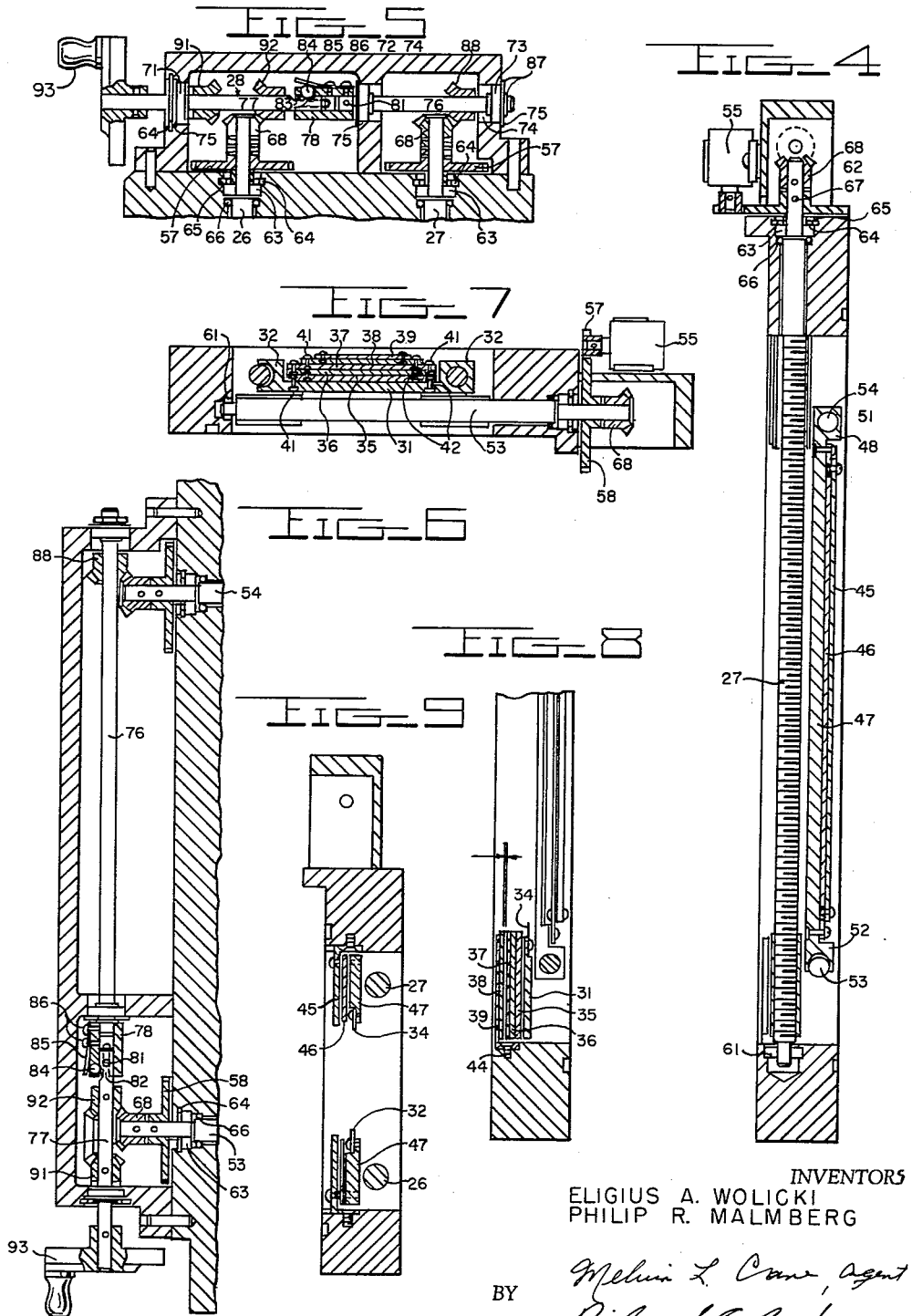

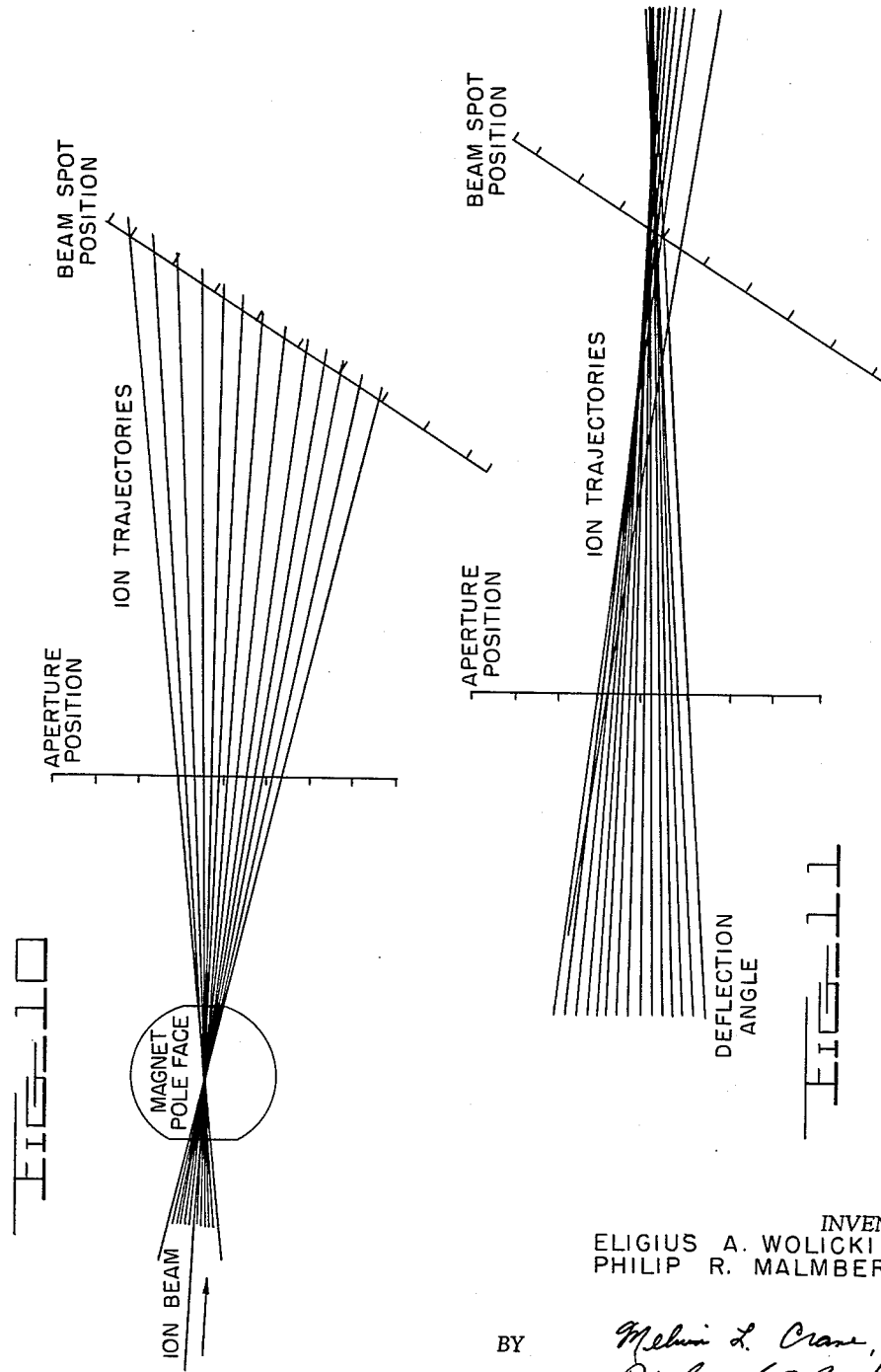

April 28, 1964 E. A. WOLICKI ETAL 3,131,299
RAY-TRACING METHOD FOR ION-OPTICAL MEASUREMENTS
Filed Dec. 29, 1961 5 Sheets-Sheet 5

INVENTORS
ELIGIUS A. WOLICKI
PHILIP R. MALMBERG

United States Patent Office 3,131,299
Patented Apr. 28, 1964

3,131,299
RAY-TRACING METHOD FOR ION-OPTICAL MEASUREMENTS
Eligius A. Wolicki, 7537 Broadview Road SE., and Philip R. Malmberg, 5935 Farmer Drive, both of Washington 22, D.C.
Filed Dec. 29, 1961, Ser. No. 163,365
4 Claims. (Cl. 250—41.9)
(Granted under Title 35, U.S. Code (1952), sec. 266)

The invention described herein may be manufactured by or for the Government of the United States of America for governmental purposes without the payment of any royalties thereon or therefor.

The present invention relates to a method for accurately locating the path of moving charged particles and more particularly to a method of accurately tracing the paths of charged particles so as to measure the ion optical properties of electric or magnetic lens systems which have a relatively large acceptance or output solid angle.

Heretofore, various methods have been used to determine beam locations of charged particles. The prior art methods either are not accurate, or they are time consuming, or they are complicated in operation, or they are useful only for a relatively narrow divergence of the ion rays being measured. These prior art devices are useful in determining the position of a ray in a field but are limited in tracing the beam beyond the focusing mechanism.

In carrying out the method of this invention, means for producing an accurately located aperture in combination with a fluorescent screen are used. (Reference may be made to an article, "A Ray-Tracing Technique for Ion-Optical Measurements" by E. A. Wolicki and A. Knudson, pp. 1–7 of NRL Quarterly on Nuclear Science and Technology, Oct.–Dec. 1960, published January 1961.) The aperture forming means is positioned at the output of a magnetic spectrometer or any other suitable charged particle lens system and the fluorescent screen is positioned a suitable distance therefrom either perpendicular to or at an angle thereto to provide a rapid and precise measurement of ion-trajectories emanating from a lens system. The size and location of the aperture through which the charged particles pass is accurately known and determines one point of the trajectory. A second point is determined by a spot appearing on the fluorescent screen where the beam hits the fluorescent screen. Graduations on the fluorescent screen indicate the location of the spot. Therefore, the trajectory of the ion path is determined by the aperture and the fluorescent spot on the fluorescent screen.

It is, therefore, an object of the invention to provide a method for accurately measuring the trajectories of charged particles beyond the output of a charged particle ion source or accelerator.

Another object is to provide a method for determining ion-optical characteristics of an electric or magnetic focusing system.

Still another object is to provide a method of measuring the trajectory of charged particles over large divergencies of the ion paths.

Yet another object is to provide a simple method for measuring the focal properties of electric or magnetic lens systems which have a relatively large acceptance or output solid angle.

While still another object is to provide a ray-tracing method which provides more information than previous methods.

The nature of this invention as well as other objects and advantages thereof will be readily apparent from considerations of the following specification relating to the annexed drawings, in which:

FIG. 1 illustrates an oblique view of a ray-tracing device for carrying out the invention;

FIG. 2 illustrates a front view of the aperture forming mechanism;

FIG. 3 illustrates a side view of the aperture forming mechanism;

FIG. 4 is a cross-sectional view of the aperture forming mechanism taken along lines 4—4;

FIG. 5 is a sectional view which illustrates a drive mechanism for the parallel horizontal plates that form a part of the aperture taken along line 5—5;

FIG. 6 is a sectional view which illustrates a drive mechanism for the parallel vertical plates that form a part of the aperture taken along line 6—6;

FIG. 7 is a sectional view along line 7—7 which illustrates a cross section of one set of the horizontal plates that form a portion of the aperture;

FIG. 8 is another sectional view which illustrates a cross section of a different view of the horizontal plates, taken along line 8—8;

FIG. 9 is a sectional view along line 9—9 which illustrates a cross-sectional view of the vertical plates;

FIG. 10 illustrates a ray-tracing diagram of a record illustrating the generation of a virtual point object by deflection of an ion beam in a cylindrically symmetric magnetic field;

FIG. 11 illustrates a ray-tracing diagram of a record illustrating the image formed at the output of a double-focusing magnetic spectrometer.

Figure 12:
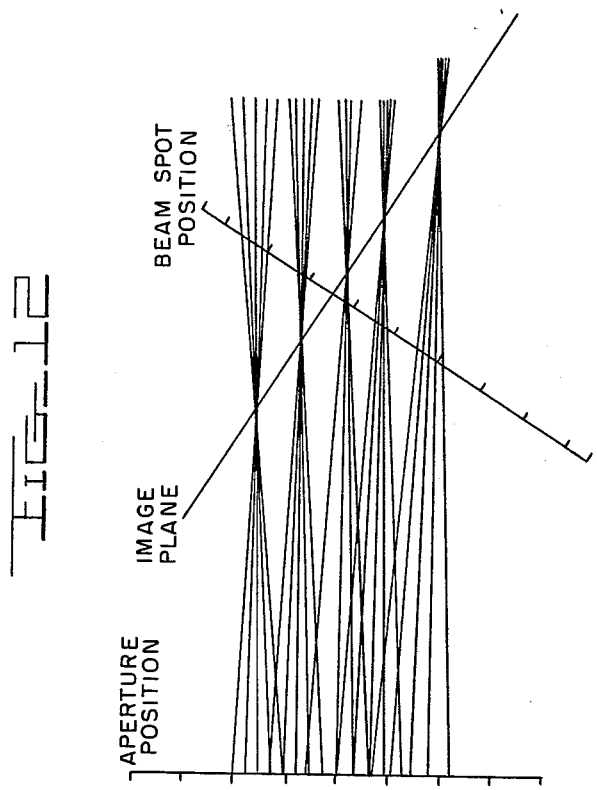
FIG. 12 illustrates a ray-tracing diagram of a record which illustrates the position of an image plane at the output of a double-focusing spectrometer with the magnetic field fixed and with different energy charged particle beams.

The ray-tracing apparatus comprises a slit box and a graduated quartz plate suitably secured together and adapted to be connected to the output of a focusing system. The slit box comprises two sets of parallel plates, each having a plurality of movable plates with the outer edges of oppositely disposed plates defining vertical and horizontal slits at right angles to each other to form a rectangular aperture or slit. The plates are adjustable for position, length, and width of the aperture by a screw arrangement which can make adjustments directly in thousandths of an inch. The gearing arrangement permits a movement of the aperture in a vertical or horizontal direction without varying the size of the aperture in transit and if the size is varied or changed the center position will remain the same. The extent of travel of the horizontal and vertical plates is such that a rectangular aperture can be positioned anywhere within an eight inch by 1.750 inch area. The quartz plate can either be tilted at an angle or positioned parallel to the aperture, and is constructed to provide a target area of eight inches by 1.750 inches.

Now referring to the drawings, there is shown by illustration a ray-tracing apparatus suitable for carrying out the method of the present invention. The apparatus includes a housing 20 which contains the drive mechanisms and the adjustable horizontal and vertical plates. A rectangular extension 21 is secured to the housing by suitable bolts 22 which also secure the apparatus to an ion producing device. A quartz plate 23 graduated in 0.10 in. x 0.10 in. squares is secured to the front of the rectangular extension at any desired angle and produces a fluorescent spot when struck by a high velocity ion beam. The aperture through which the beam passes is formed by two sets of horizontal plates 24 and two sets of vertical plates 25 wherein each set pair is parallel to each other. The horizontal plates are moved relative to each other by parallel threaded screws 26, 27 which have the same threads and are rotated by a drive means 28. Each set of horizontal plates is provided with one plate 31 which is provided with a threaded sleeve 32 at one end and a bifurcated end 33 at the other end which parallels the screws 26 and 27. The threaded sleeve 32 of one set matches with the thread of screw 26 whereas the sleeve of the other set matches with the thread of screw 27. The bifurcated end paralleling the sleeve ends fits around the opposite screw such that as the plates are moved by their screw thread sleeve end by their respective screw, the bifurcated end acts as a guide along the opposite screw and prevents rotation thereof. Thus, the leading edge of plate 31, when moved, will be perpendicular to the screws 26 and 27. A thin flat plate 34 is secured to the leading edge of the plate 31 in order to define a precise straight edge to form a part of an aperture. The other edges of the aperture are formed by vertical plates which will be described in more detail later.

The sets of horizontal plates are represented by FIGS. 7 and 8 which illustrate different cross-sectional views of one set. Each set of horizontal plates comprises six telescoping plates 31, and 35–39 which are positioned one over the other with each plate connected with its adjacent plate by rivets 41. Each plate is provided with two countersunk holes 42 near their trailing edge; except plate 31, wherein the slots extend substantially across the length of each plate parallel to the threaded sleeve 32. Rivets 41 pass through the holes 42 in the lower plate upwardly through the slot 43 in the adjacent upper plate and are secured with a loose fit such that the rivets will ride along the slots without moving the plate until the rivets reach the end of the run of slots. Adjacent plates are connected to each other in this manner such that the plates can be moved successively relative to each other. The uppermost plate 39 is secured at the trailing edge to the housing by screws 44 such that the plate 39 will not be moved by its lower adjacent plate 38. The plates have sufficient length such that when all plates are extended to the maximum permitted by its adjacent upper plate, they will cover the entire housing opening. This will permit forming an aperture anywhere within the housing opening when coupled with the vertical sets of plates which operate in the same manner. In moving the plates of each set to form a slit, the bottom plate 31 of each set of parallel plates is moved by rotating the screws 27 and 28 in opposite directions in their respective threaded sleeve while the bifurcated ends act as guides about the opposite screw. Thus, one bottom plate is moved by one screw 26 or 27 and guided by the other screw during its movement along the screw which passes through the screw threaded arm. As the plates 31 move toward each other the rivets 41 move along the parallel slots 43 in the adjacent plate until the rivets reach the end of the run of the slots. When the rivets in one plate reach the end of the run of the slots in the adjacent upper plate, the adjacent upper plate will begin to move therewith relative to its adjacent upper plate, etc., until the bottom plates 31 of each set meet at the center of the opening in the housing. Thus, the bottom plates can be adjusted for any spacing therebetween from zero to eight inches between the bottom plates of each set with a width in the horizontal direction of 1.750 inches which is limited by the plates that are positioned with their leading edges extending in a vertical plane. After setting the proper spacing between the horizontal plates, the drive wheel can be shifted such that the screws 26 and 27 rotate in the same direction, thereby shifting the plates together at the same rate, maintaining the same set spacing. The plates can be shifted together over the entire length of the opening while maintaining the set spacing.

The device is provided with two sets of plates in the vertical plane which are adjustable relative to each other to form a spacing between the upper plates in a horizontal direction of from zero to 1.750 inches with a slit that extends in the vertical direction for a length of eight inches, and limited by the plates in which the leading edge extends in the horizontal plane. The sets of plates that form the vertically extending slot comprise three plates, a bottom plate 45 which is secured at one end to the housing, a middle plate 46, and an upper plate 47. The middle and bottom plates have parallel slots therein within which rivets 41 ride to hold the plates together and to enable the upper and middle plates to be moved relative to the bottom plate to form a vertical slit of a specific width. The upper plate 47 of each set is provided with an arm or sleeve 48 on one side which has a screw threaded opening 51 therethrough and a bifurcated side 52 parallel thereto. These sets of vertical plates are adjusted relative to each other to form a slit of a specific spacing when screws 53 and 54 similar to screws 26 and 27 are rotated in opposite directions and then when the drive mechanism is shifted and the screws are rotated in the same direction, the plates can be moved simultaneously in the same direction such that a slit of a specific spacing can be moved anywhere across the 1.75 inch opening.

The plates forming the horizontal slit and the plates forming the vertical slit can be moved separately across their respective opening spacing in the housing to form a rectangular opening of any size between the dimensions of 1.75 inch by 8 inches. The spacing between the respective sets of plates can be determined by counters 55 which indicate the movement of each plate in thousandths of an inch by rotatable indicator wheels 56 such as an odometer. Each of the indicator wheels is graduated in tenths to represent one thousandth of an inch movement of each plate. The counter is provided with a drive gear 57 which is driven by a gear 58 which is secured to the shank of a threaded screw. Each threaded screw is provided with a counter 55 which indicates the movement of each set of plates moved by their respective screw, 26, 27, 53 or 54. As shown in FIG. 2, each set of plates is separated for their maximum spacing. As such, one counter for the horizontal plates indicates 00000 and the counter for the other set of horizontal plates indicates 08000, this indicates that the two sets of plates are at their maximum spacing of eight inches. Likewise, the two sets of vertical plates are set for their maximum spacing of 1.75 inches which is represented by their respective counters that indicate 00000 and 01750. In forming a slit of a particular size, say 0.030 inch by 0.030 inch, the sets of vertical plates are moved toward each other until one counter reads 890 and the other reads 860, the differences indicate the spacing between the two to be 0.030 inch. Therefore, a slit of 0.030 inch extends the entire length of eight inches across the housing opening. Likewise, the horizontal sets of plates are moved toward each other until the reading on one counter is 4015 and the reading on the other counter is 3985, the difference giving the spacing between the horizontal plates of 0.030 inch which extends across the entire width of 1.750 inches across the housing opening. Since the slits formed by the vertical and horizontal plates cross each other, an aperture of 0.030 inch by 0.030 inch is formed at the center of the housing opening. Now, suppose the beam to be detected is located in the second quadrant of the housing opening and the same sized slit is desired, then the hand drive mechanisms are shifted such that the vertical and horizontal plate drive screws of each respective plate sets are rotated in the same direction. Rotating the drive screws of each respective set in the same direction moves the vertical slit over and across the second and third quadrants while maintaining the slit at the same spacing of 0.030 inch, whereas the horizontal plates are moved together upwardly across the first and second quadrant. The spot where the slits intersect as formed by the vertical and horizontal slits forms a 0.030 inch by 0.030 inch slit or aperture in the second quadrant.

The exact position of the aperture can be determined by noting the reading on the counters for the vertical and horizontal plate sets and comparing this with the maximum distance of the travel of the plates. By leaving the horizontal plate sets set at the above position, the position of the aperture can be changed along a line in the first and second quadrants by moving the vertical plates. Also, by leaving the vertical plates set at the above position in the second quadrant, the horizontal plates can be moved simultaneously and the slit aperture can be changed to any place along the vertical slit in the second and third quadrants. By first setting the slit spacing at the desired width by rotating the respective screws in opposite directions and then shifting the drive shaft, a slit of the desired size can be positioned anywhere within the area bounded by the housing opening, that is, over the entire area of 1.75 inches by eight inches as shown in FIG. 2.

Each of the drive screws 26, 27, 53 and 54 is journaled in a bearing 61 at one end and is provided with a shaft 62 at the other end which extends through the housing and is provided with a bearing 63 which is held in place by a snap ring 64. The snap ring 64 seats in a slot 65 in the housing. An O-ring 66 is positioned between the bearing and the housing to provide a vacuum seal. Each drive shaft has secured thereto by suitable pins 67 a gear wheel 57 for driving the counters 55 and a driven gear 68 for rotating the drive screw. The driven gear is provided with gear teeth thereon set at about a 45° angle to the shaft to match with suitable drive gears. Each set of drive screws for the horizontal and vertical plates is driven by similar drive means which includes a two piece drive shaft positioned perpendicular to each set of drive screws and across the shaft end of the screws. The drive shaft passes through bearings 71, 72 and 73 which are press fitted into openings 74 in the drive housing, and prevented from passing through the opening by a lip 75. Bearing 71 is secured in position by a retainer ring 64 which prevents the bearing from being knocked loose during operation. Each drive shaft is made with a fixed section 76 which is held against any axial movement and a section 77 which is secured for axial movement. The two sections 76 and 77 are secured together by a coupling 78 which is secured to drive section 76 by screws 81 and is provided with a slot 82 parallel with the drive section 77. A screw 81 is passed through the slot 82 and secured in drive section 77 to permit axial movement of the drive section 77 relative to the coupling and fixed section 76. The axially movable drive section 77 is provided with suitably spaced notches 83 therein and the coupling 78 is provided with a ball 84 held in place by a leaf spring 85 secured in place by screws 86 which combine to form a detent mechanism to hold the axially movable shaft in one of two different positions. The drive section 76 is held against any axial movement by the coupling at one end and by a retaining ring 87 at the other end, also, the coupling and retaining ring will prevent bearings 72 and 73 from coming loose from their mounting. Each drive section 76 is provided with a drive gear 88 which is in constant mesh with the driven gear 68 on screws 27 and 53, whereas the axially movable drive section 77 is provided with two drive gears 91 and 92 spaced such that when the detent is in one notch, such as shown, each drive gear 92 of the respective drive shafts will be meshed with a driven gear 68 on screw 26 and screw 53 and when the drive section is moved axially such that the detent is matched with the other notch, each drive gear 91 will be meshed with driven gear 68. The axially movable drive section is constructed such that either drive gear 91 or 92 will be meshed with gear 68 at all times depending on the direction of rotation of the screws desired. Each drive gear 92 will rotate screws 26 and 53 in an opposite rotational direction from screws 27 and 54 respectively when meshed in drive position, whereas each drive gear 91 will drive gear 68 and screws 26 and 53 in the same rotational direction as screws 27 and 54 respectively when meshed therewith. When each pair of screws are rotated in opposite rotational directions the horizontal or vertical plates will be moved toward or away from each other depending on the direction in which the screws are rotated and when the screws are rotated in the same rotational direction the parallel or vertical plates will be moved in the same direction while maintaining the same spacing therebetween as the plates are moved simultaneously. The drive gears are driven by a hand operated wheel 93 as shown or by any other suitable drive means.

In operation, the slit forming device can be used in carrying out the method of this invention for determining a virtual point object of a charged particle beam generated by deflecting the beam in a cylindrically symmetric magnetic field. The ray-tracing apparatus is positioned at the output of the magnetic field as shown in FIG. 1 and evacuated along with the system. An aperture opening of 0.030 inch by 0.030 inch is formed by adjustment of the plates and positioned to transmit the incident ion ray. This accurately determines one point in the trajectory of the ion-ray. A second point is determined by a fluorescent spot produced when the ray strikes the quartz plate which is graduated in 0.10 inch squares to produce a calibrated grid surface. The two points then determine the trajectory of the ion-ray. The measurement for different rays is repeated several times to obtain the desired focal characteristics by moving the aperture about in the field and recording the point of the aperture setting as well as the fluorescent spot for each setting. From the knowledge of the relative spacing and orientation of the slit box and quartz plate it is possible to draw a given ion trajectory and to determine the object size of the beam. FIG. 10 illustrates the ray-tracing diagram illustrating the generation of the point object by deflection of the ion beam in a cylindrically symmetric magnetic field as pointed out above.

FIG. 11 illustrates a ray-tracing diagram made by the method of the invention showing the image formed at the output of a 180° double-focusing magnetic spectrometer, the deflection angle being that produced by the object generating magnet. The method determines the position and size of the image, enables one to relate the aberrations to the magnitude of the acceptance solid angle of the spectrometer and to the incident beam energy which enables adjustment of the spectrometer for highest resolving power consistent with the desired acceptance solid angle. Also, the image plane of the spectrometer can be determined by the method.

With the magnetic field in the spectrometer fixed, objects generated with different energy beams will, over a limited range, be brought to focus at different points along a plane called the image plane. FIG. 12 illustrates such an image plane located with the ray-tracing device.

The method of illustrating the ion trajectory has been simplified by making an accurate scale drawing, in one plane, showing the positions of the slit box and quartz plate accurately marking the corresponding graduations thereon and then reproducing the drawing to form graphic copies. These copies then serve as a graph paper for plotting the ray-tracing data directly on the graph paper, the ray-tracing data being that obtained from the aperture position indicated by the counters and the fluorescent spot made on the quartz plate by the ray striking the plate. A line drawn between the two points and extended will intersect with other such lines to indicate the focal point of the images produced by the focusing system. In such a manner, rapid and accurate location of the image or image plane of a lens system can be determined. Obviously many modifications and variations of the present invention are possible in the light of the above teachings. It is therefore to be understood that within the scope of the appended claims the invention may be practiced otherwise than as specifically described.

What is claimed is:

1. A method of tracing the trajectory of an ion ray which comprises positioning an aperture in the path of said ion ray, positioning an ion-sensitive screen a distance from said aperture, adjusting said aperture to pass an ion-beam, recording the position of said aperture, recording the position of a spot on said ion-sensitive screen due to said ion-beam incidence on said ion-sensitive screen, moving said aperture to pass other ion-beams and recording the position of said aperture and ion-beam spot produced on said ion-sensitive screen, drawing a line through said recorded aperture positions and corresponding ion-beam spot to provide a pattern of the ion ray paths produced.

2. A method of obtaining various ion-optical characteristics of a system by tracing the trajectory at the output of a lens system which comprises forming an aperture at said output in the path of an ion-beam, locating a fluorescent screen a distance from said aperture, recording the position of said aperture, recording the position of a visible spot on the fluorescent screen due to said ion-beam and drawing a line through said recorded aperture and said recorded visible spot and duplicating the above steps to produce other lines which provides a pattern of ion ray paths for ions of different energies.

3. A method of determining the focal point at the output of a lens system which comprises forming an aperture of a predetermined size at the output of said lens system, positioning a fluorescent screen a known distance from said aperture, positioning said aperture to permit passage of an ion ray on to said fluorescent screen, recording the position of said aperture, recording the position of a spot on said fluorescent screen made by an ion ray passing through said aperture, moving said aperture while maintaining the same size aperture, recording the position of a spot on said fluorescent screen for each recorded position of said aperture, and drawing a line through the recorded aperture position and the corresponding recorded fluorescent spot to provide a pattern of ion ray paths for ions of different energies which lines will cross at the focal point of the lens system.

4. A method of determining the focal point at the output of a lens system in an ion accelerator which comprises securing an aperture forming means in combination with a spaced fluorescent screen to said ion accelerator, evacuating said system, and operating said accelerator to produce ions, forming an aperture of a specified size, positioning said aperture in the path of an ion ray, recording the position of said aperture, recording the position of a fluorescent spot on said screen produced by said ion ray, moving said aperture to other positions to pass other ion rays and recording the positions of the aperture and the corresponding fluorescent spots produced by the ion rays, and drawing a line through the recorded aperture positions and the corresponding fluorescent spots to provide a pattern of the recorded ion paths wherein the interception of the paths indicate the focal point of the system.

References Cited in the file of this patent
UNITED STATES PATENTS 2,642,535     Schroeder _____ June 16, 1953
2,814,728     Langsdorf _____ Nov. 26, 1953